(12) United States Patent
Dai et al.

(10) Patent No.: US 8,427,365 B2
(45) Date of Patent: Apr. 23, 2013

(54) METHOD AND SYSTEM FOR ESTIMATING POSITION USING DUAL REAL TIME KINEMATIC ENGINES

(75) Inventors: Liwen Dai, Chino Hills, CA (US); Chaochao Wang, Los Angeles, CA (US); Daniel J. Eslinger, Redondo Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 275 days.

(21) Appl. No.: 12/767,897

(22) Filed: Apr. 27, 2010

(65) Prior Publication Data

US 2011/0187598 A1  Aug. 4, 2011

Related U.S. Application Data

(60) Provisional application No. 61/299,792, filed on Jan. 29, 2010.

(51) Int. Cl.
*G01S 19/43* (2010.01)

(52) U.S. Cl.
USPC ............ 342/357.26; 342/357.25; 342/357.27; 701/477

(58) Field of Classification Search .. 342/357.2–357.78; 701/477
See application file for complete search history.

(56) References Cited

U.S. PATENT DOCUMENTS

| | | | |
|---|---|---|---|
| 5,748,145 A | 5/1998 | Talbot et al. | |
| 5,914,685 A | 6/1999 | Kozlov et al. | |
| 7,298,319 B2 | 11/2007 | Han et al. | |
| 2005/0001762 A1* | 1/2005 | Han et al. | 342/357.04 |
| 2006/0106533 A1 | 5/2006 | Hirokawa | |
| 2008/0074319 A1* | 3/2008 | Han et al. | 342/357.04 |

FOREIGN PATENT DOCUMENTS

| | | |
|---|---|---|
| WO | 2005/054889 | 6/2005 |
| WO | 2008/141320 | 11/2008 |
| WO | 2009/136254 | 11/2009 |

OTHER PUBLICATIONS

S. Khanafseh et al. New Applications of Measurement Redundancy in High Performance Relative Navigation Systems for Aviation. Proceedings of the ION GNSS 19th International Technical Meeting of the Satellite Division. Sep. 26-29, 2006, pp. 3024-3034, XP55002615.

J. Wang et al. Rover Autonomous Integrity Monitoring of GNSS RTK Positioning Solutions with Multi-Constellations, Proceedings of the ION GNSS 22nd International Meeting of the Satellite Divison of The Institute of Navigation, Savannah, GA. Sep. 22-25, 2009, pp. 1361-1370. XP 55002617.

(Continued)

*Primary Examiner* — Jack W Keith
*Assistant Examiner* — Nga X Nguyen

(57) ABSTRACT

A method and system for estimating the position comprises measuring a first carrier phase of a first carrier signal and a second carrier phase of a second carrier signal received by a location-determining receiver. A primary real time kinematic (RTK) engine or receiver data processing system estimates a primary integer ambiguity set associated with at least one of the measured first carrier phase and the measured second carrier phase. A quality evaluator determines if a primary integer ambiguity set is resolved correctly to the predefined reliability rate during an earlier evaluation period. A secondary real time kinematic (RTK) engine or receiver data processing system estimates a secondary integer ambiguity set associated with at least one of the measured first carrier phase and the measured second carrier phase during a later period following the earlier evaluation period.

15 Claims, 9 Drawing Sheets

OTHER PUBLICATIONS

Bock, Dr. Y.; Macdonald, T. J.; Merts, J. H.; Bock, Dr. L.; Fayrnan, Dr. J. Epoch-by-EpochTM Real-Time GPS Positioning in High Dynamics and at Extended Ranges. [online]. Retrieved from the Internet: <URL: http://www.geodetics.com/publications/8_ITEA_Journal_Oct%2004.pdf>.

* cited by examiner

METHOD AND SYSTEM FOR ESTIMATING POSITION USING DUAL REAL TIME KINEMATIC ENGINES

CROSS REFERENCE TO RELATED-APPLICATION

This document claims priority based on U.S. provisional application No. 61/299,792, filed on Jan. 29, 2010, and entitled METHOD AND SYSTEM FOR ESTIMATING POSITION USING DUAL REAL TIME KINEMATIC ENGINES, under 35 U.S.C. 119(e).

FIELD OF THE INVENTION

This invention relates to a method and system for estimating position, attitude, or both of an object or vehicle using dual real time kinematic engines.

BACKGROUND OF THE INVENTION

A location-determining receiver, such as a Global Positioning System (GPS) receiver estimates the position, attitude (e.g., tilt, roll, or yaw), or both of an object or a vehicle. The location-determining receiver may experience imprecise pseudo-range and carrier phase measurements, where the location-determining receiver receives (e.g., transiently) one or more satellite signals of low signal strength or poor signal quality.

Certain location-determining receivers may use an error-reducing filter (e.g., Kalman filter) to filter the results of carrier phase measurements or processed carrier phase measurement data, for example. Some location-determining receivers may use a Receiver Autonomous Integrity Monitoring (RAIM) technique to detect errors of analyzed pseudo-range measurements by comparing the analyzed pseudo-range measurements to reference pseudo-range measurements, where erroneous or outlying pseudo-range measurements can be excluded from a position or attitude solution to improve accuracy of the estimated position or attitude of the object or the vehicle. Neither the error-reducing filter approach, nor the RAIM technique fully addresses the aforementioned problem of imprecise pseudo-range and carrier phase measurements, where the location-determining receiver receives (e.g., transiently) one or more satellite signals of low signal strength or poor signal quality. Thus, there is a need for an improved method and system for estimating position using dual real time kinematic engines.

SUMMARY OF THE INVENTION

In accordance with one embodiment, the method and system for estimating the position of an object or a vehicle comprises measuring a first carrier phase of a first carrier signal and a second carrier phase of a second carrier signal received by a location-determining receiver. A primary real time kinematic (RTK) engine or a receiver data processing system estimates a primary integer ambiguity set associated with at least one of the measured first carrier phase and the measured second carrier phase. A quality evaluator determines if a primary integer ambiguity set is resolved correctly to the predefined reliability rate during an earlier evaluation period (e.g., an epoch). A secondary real time kinematic (RTK) engine or receiver data processing system estimates a secondary integer ambiguity set associated with at least one of the measured first carrier phase and the measured second carrier phase during a later period (e.g., a later epoch) following the earlier evaluation period.

DESCRIPTION OF THE PREFERRED EMBODIMENT

Figure 1:
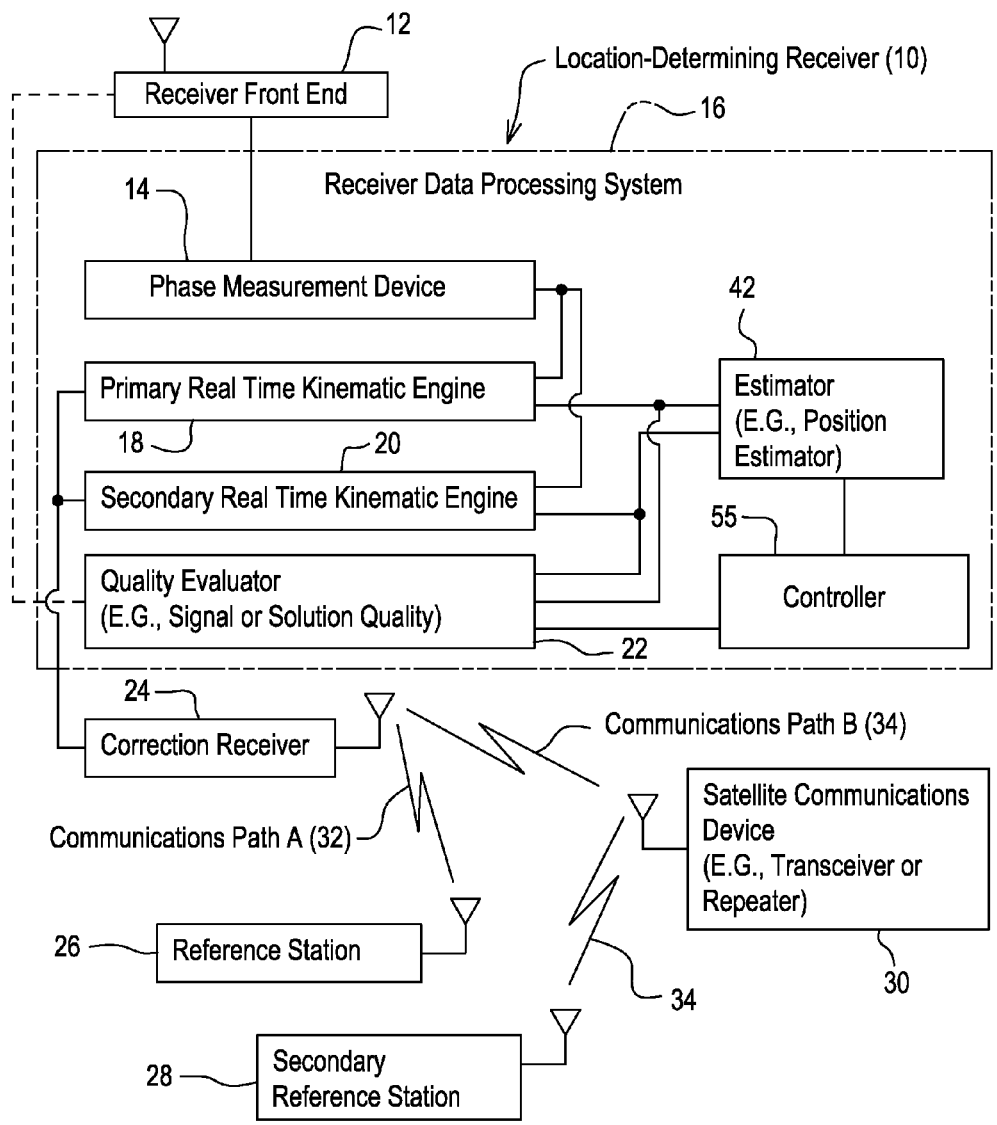
FIG. 1 is a block diagram of a first embodiment of a system for estimating position using dual real time kinematic engines.

FIG. 1 illustrates a location-determining receiver 10 that comprises a receiver front end 12 coupled to a receiver data processing system 16. The location-determining receiver 10 is associated with a correction receiver 24. The correction receiver 24 may be integrated into the location-determining receiver 10 or may communicate with the location-determining receiver 10 via a data port. The correction receiver 24 receives correction data (e.g., reference carrier phase correction data) from at least one of a reference station 26 and a secondary reference station 28. The reference station 26 communicates via a wireless or electromagnetic signal to the correction receiver 24 via communications path A (32), for example. The secondary reference station 28 communications via wireless or electromagnetic signals to the correction receiver 24 via a satellite communications device 30 via communications path B (34), for example.

The receiver data processing system 16 may comprise any of the following: one or more hardware modules, one or more electronic modules, one or more software modules, an electronic data processor, an electronic data processor and associated electronic data storage, and a general purpose computer for executing software, logic or program instructions. The electronic data processor (i.e., data processor) may comprise one or more of the following: a microprocessor, a programmable logic array, a digital signal processor, an application specific integrated circuit, a logic circuit, or another device for executing software, logic, arithmetic, or program instructions.

In FIG. 1, the receiver data processing system 16 comprises a phase measurement device 14, a primary real time kinematic engine 18, a secondary real time kinematic engine 20, a quality evaluator 22, a controller 55 and an estimator 42 (e.g., a position estimator or a position and attitude estimator). The phase measurement device 14, the primary real time kinematic engine 18, a secondary real time kinematic engine 20, the quality evaluator 22, the controller 55, and the estimator 42 may communicate with one another. The lines that interconnect the phase measurement device 14, the primary real time kinematic engine 18, and the secondary real time kinematic engine 20, the quality evaluator 22, the controller 55 and the estimator 42 in FIG. 1 illustrate logical data paths, physical data paths, or both. A logical data path means a virtual data path or communication of data between software modules or between one or more software programs, for example. A physical data path means a transmission line or one or more data buses that support communications of data, logic level signals, electrical signals, or electromagnetic signals, for example.

The receiver front end 12 may comprise any suitable circuit for receiving satellite signals transmitted by one or more satellites (e.g., navigation satellites). The receiver front end 12 may comprise a spread-spectrum receiver or code division multiple access receiver (CDMA) that is capable of receiving multiple carriers transmitted by one or more satellites within a constellation of satellites. For example, the receiver front end 12 may comprise a preamplifier or amplifier for amplifying satellite signals, a mixer and a reference oscillator, where the amplifier input is coupled to an antenna, the amplifier output is coupled one mixer input, the reference oscillator is coupled to the other mixer input, and the mixer output is coupled to the receiver data processing system 16 or phase measurement device 14. In one illustrative embodiment, an analog-to-digital converter provides an interface between the receiver front end 12 and the receiver data processing system 16.

The receiver data processing system 16 comprises the phase measurement device 14. The phase measurement device 14 comprises any device, integrated circuit, electronic module, or data processor for measuring the phase of a carrier signal. The phase measurement device 14 measures or estimates the observed phase of one or more carrier signals provided by the receiver front end 12. The measured phase may be expressed in integer wavelengths of the carrier signal, fractional wavelengths of the carrier signal, and/or degrees of the carrier signal.

The phase measurement device 14 may determine one or more of the following: (1) a first measured phase component of fractional wavelengths of the first carrier signal, the second carrier signal or both, and (2) a second measured phase component of whole wavelengths of the first carrier signal, the second carrier signal or both. The latter second measured phase component may be determined by a counter (e.g., zero-crossing counter) that counts transitions of a received, reconstructed or processed carrier signal that intersect with an X axis at a reference magnitude (e.g., 0 voltage) in the time domain, where X represents time and the Y axis represents magnitude of the carrier signal. However, the phase measurement device 14 relies upon further processing in the location-determining receiver 10 to determine or resolve a whole cycle integer ambiguity that may cause the second measured phase component to be in error or offset by a whole number of wavelength cycles (e.g., to estimate a distance or range between a corresponding satellite and the location-determining receiver 10).

The primary real time kinematic engine 18 comprises a search engine or other software instructions for searching for or determining an integer ambiguity solution sets for the phase of one or more received carrier signals from multiple satellites. The secondary real time kinematic engine 20 comprises a search engine or other software instructions for searching for or determining an integer ambiguity solution sets or ambiguity resolution for the phase of one or more received carrier signals from multiple satellites. The integer ambiguity solutions sets refer to integer-cycle phase ambiguities in the received carrier phase of the received carrier signals (e.g., L1 signal at 1.57542 GHz, the L2 signal at 1.22760 GHz or similar signals) transmitted by one or more satellites, for example. The search engine may use a least squares or Kalman filtering techniques to reduce the search space or reach one or more ambiguity set solutions for the integer-cycle phase ambiguities of the carrier signals transmitted from the satellites.

In one embodiment, the quality evaluator 22 comprises an evaluator for determining the quality of the ambiguity solution or ambiguity resolution. In an alternate embodiment, the quality evaluator 22 may comprise an evaluator for determining the quality of the ambiguity solution and that signal quality of received satellite signals, where the communications line, indicated as the dashed line in FIG. 1, supports such alternate embodiment.

In one embodiment, the quality evaluator 22 may determine the quality level of a primary ambiguity solution, provided by the primary real time kinematic engine 18 (or main RTK engine), by comparing the primary ambiguity solution to the secondary ambiguity solution available from the secondary real time kinematic engine 20 (or backup RTK engine), where higher conformity between the two ambiguity solution sets is generally indicative of higher quality, unless the location-determining receiver 10 experiences the reception of low signal quality during a relevant evaluation time period. The quality evaluator 22 determines that the carrier signal is below a minimum signal level threshold or that the modulation on the first carrier or second carrier is decoded with a bit error rate, word error rate, or frame error rate that exceeds a maximum error rate, for instance.

In another embodiment, the quality evaluator 22 supports or uses a series of reliability tests to select the correct ambiguity set, which includes any of the following techniques: a ratio test (the quadratic form of carrier phase residuals after applying candidate ambiguity set), ambiguity repeatability test, and a Chi-square test on quadratic form of carrier phase residuals.

The controller 55 comprises a data processor or other data processing device for controlling the primary real time kinematic engine 18, the secondary real time kinematic engine 20, or the output of the primary real time kinematic engine 18 and the output of the second real time kinematic engine. The controller input of the controller 55 is capable of communicating with the quality evaluator 22 and the controller output of the controller 55 is capable of communicating with the estimator 42. In response to quality data or output data from the quality evaluator 22, the controller 55 may send control data or a control signal to the estimator 42 to use the data output of the primary real time kinematic engine 18, the secondary real time kinematic engine 20, or both.

The controller 55 may send control data to the activate, deactivate, reset, reinitialize, start, or stop, the primary real time kinematic engine 18, the secondary real time kinematic engine 20, or both. The controller 55 may activate or start the secondary real time kinematic engine 20 with a temporal offset (e.g., in a different or later epoch) to increase the accuracy of estimated position or attitude determined by the receiver data processing system 16, even under conditions of poor reception of satellite signals or low signal level quality of the received satellite signals. An epoch may be defined by one or more of the following: a starting time, an ending time, a duration or interval, or a discrete instant when a GPS receiver takes a snapshot of incoming radio frequency or microwave ranging signal and a generates pseudo-range/carrier phase measurement. The current epoch refers to the most recent instant when the latest GPS measurement is generated. In one configuration, the controller may swap or rotate the responsibility of the main role and backup role of the primary real time kinematic engine 18 and the secondary real time kinematic engine 20, respectively, with or without staggered or offset starting of the kinematic engines (18, 20) after the swap or role reversal.

The estimator 42 comprises a data processor or other data processing device for estimating a position, attitude, or both of an object or vehicle associated with the location-determining receiver 10. The estimator 42 is coupled to or communicates with the primary real time kinematic engine 18, the secondary real time kinematic engine 20, and the controller 55. Once the integer ambiguity solutions set is determined, the estimator 42 or location determining receiver 10 can use the phase carrier measurement data to provide an accurate estimation of the distance or range between each satellite and the location-determining receiver 10 based on the known propagation speed (i.e., speed of light). In turn, the ranges between three or more satellites and the location-determining receiver 10 can be used to estimate the position or attitude of the receiver.

The reference station 26 comprises a reference location-determining receiver at a known or fixed location, a reference data processing system, and a transmitter or transceiver. In one embodiment, the reference location-determining receiver 10 detects carrier phase data associated with one or more carrier signals and determines an initial ambiguity solution or ambiguity solution set for multiple satellite signals received at the location-determining receiver 10. The reference data processing system receives carrier phase data and the initial ambiguity solution corrects it, by using the known or fixed location of the reference location-determining receiver 10, to determine an enhanced ambiguity solution. In one example, corrected carrier phase data comprises the estimated carrier phase and the enhanced ambiguity solution, or other data derived therefrom. In turn, the corrected carrier phase data is transmitted via a wireless signal or electromagnetic signal to the correction receiver 24. The correction receiver 24 receives the corrected carrier phase data which is available for use by at least one of the primary real time kinematic engine 18 and the secondary kinematic engine 20, or by the estimator 42 to determine a position of the vehicle or object associated with the location-determining receiver 10.

Figure 2:
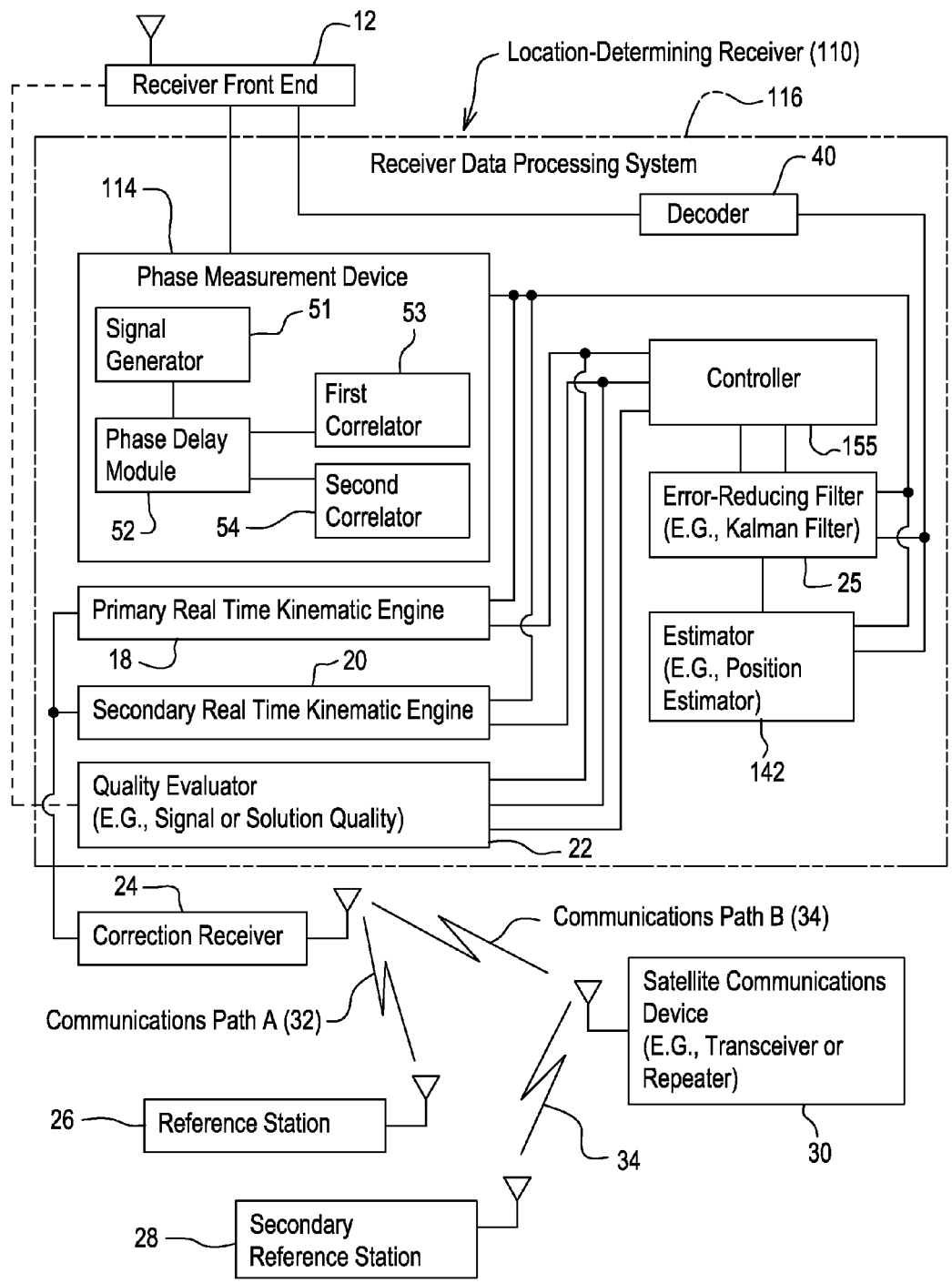
FIG. 2 is a block diagram of a second embodiment of a system for estimating position using dual real time kinematic engines.

The first embodiment of the location-determining receiver 10 FIG. 1 is similar to the second embodiment of FIG. 2, except in the second embodiment of FIG. 2 the location-determining receiver 110 comprises an error-reducing filter 25, a position estimator 142, and a controller 155. Further, in one configuration, the phase measurement device 14 of FIG. 2 comprises a signal generator, a phase delay module coupled to a first correlator and second correlator. Like reference numbers in FIG. 1 and FIG. 2 indicate like elements.

The error-reducing filter 25 comprises a Kalman filter or variant thereof for reducing or mitigating errors, such as measurement error. A Kalman filter may comprise a predictive filtering device or circuit that uses summation of signals, delay, and feedback to process data and compensate for the effects of noise and uncertainty in measured data or otherwise. Resetting or reinitialization may refer the same the reinitialization of the states of the error reducing or Kalman filter.

A decoder 40 comprises a demodulator or other device for demodulating the pseudo-random noise code (e.g., coarse acquisition code (C/A) or other more precise civilian or military coding) that modulates one or more carriers. The L1 carrier signal is modulated with the course acquisition (C/A) code and the encrypted precise code P(Y), whereas the L2 signal is modulated with the encrypted P(Y) code. In one embodiment, the decoder 40 may comprise a code generator coupled to an input delay module, where an output of the delay module is coupled to a correlator for measuring the correlation between a reference pseudorandom noise code, which is delayable by known increments by the delay module, and a received pseudorandom noise code from a receiver front end 12. The decoder may also facilitate decoding of the navigation information that modulates a carrier signal, such as ephemeris data.

The position estimator 142 comprises an electronic module, a software module, or both for estimating a position of an object or vehicle associated with the location-determining receiver 110. The position estimator 142 may use one or more of the following data sources to determine an estimated position or attitude of the antenna of the location determining receiver or an associated object or vehicle: the decoded pseudo random noise code, the carrier phase measurement data, the encrypted precise code (e.g., P(Y) code), the course acquisition code, navigation information, and integer-cycle phase ambiguity data, and reference station 26 carrier phase data, where the reference station carrier phase data may be integrated in the integer-cycle phase ambiguity data.

The input of the decoder 40 is coupled to the receiver front end 12. The output of the decoder 40 is capable of communication with the position estimator 142, the error-reducing filter 25, or both. The error-reducing filter 25 may receive input data from the primary real time kinematic engine 18, the secondary real time kinematic engine 20, or both, where the input data comprises ambiguity solution data (e.g., integer ambiguity set, primary integer ambiguity set or secondary integer ambiguity set) for the corresponding carrier phase measurement data.

The quality evaluator 22 may evaluate the solution quality of the ambiguity solution data provided by the primary real time kinematic engine 18, the secondary real time kinematic engine, or both. In an alternate embodiment, quality evaluator 22 may be capable of measuring signal quality of the received carrier. The quality evaluator 22 determines a quality assessment of the ambiguity solution data, the received signals by the location determining receiver 110, as indicated above in conjunction with FIG. 1.

In one embodiment, the quality evaluator 22 may also provide a control signal or control data to the controller 155 that is interposed as an intermediary between the primary real time kinematic engine 18 and the error reducing filter and as an intermediary between the secondary real time kinematic engine and the error reducing filter.

In the configuration of FIG. 2, the controller 155 may comprise electronic or electrical switching circuits, software switching or routing, data storage and retrieval, data indexing or some combination thereof, that supports the selection of a primary ambiguity solution (e.g., primary integer ambiguity set) of the primary real time kinematic engine 18, a secondary ambiguity solution (e.g., secondary integer ambiguity set) of the secondary real time kinematic engine 20, or some combination or weighted combination of both as input to the error reducing filter. The controller 155 may also determine whether one or both of the primary real time kinematic engine 18, and the secondary real time kinematic engine are active or not, or whether the primary real time kinematic engine 18 and the secondary real time kinematic engine 20 will swap, switch, transfer or rotate responsibilities (e.g., rotation of main role and back-up role) for some time period. The controller 155 can support switching back responsibility to the original responsibilities of the engines from such a swap, switch or transfer of responsibility.

Figure 3:
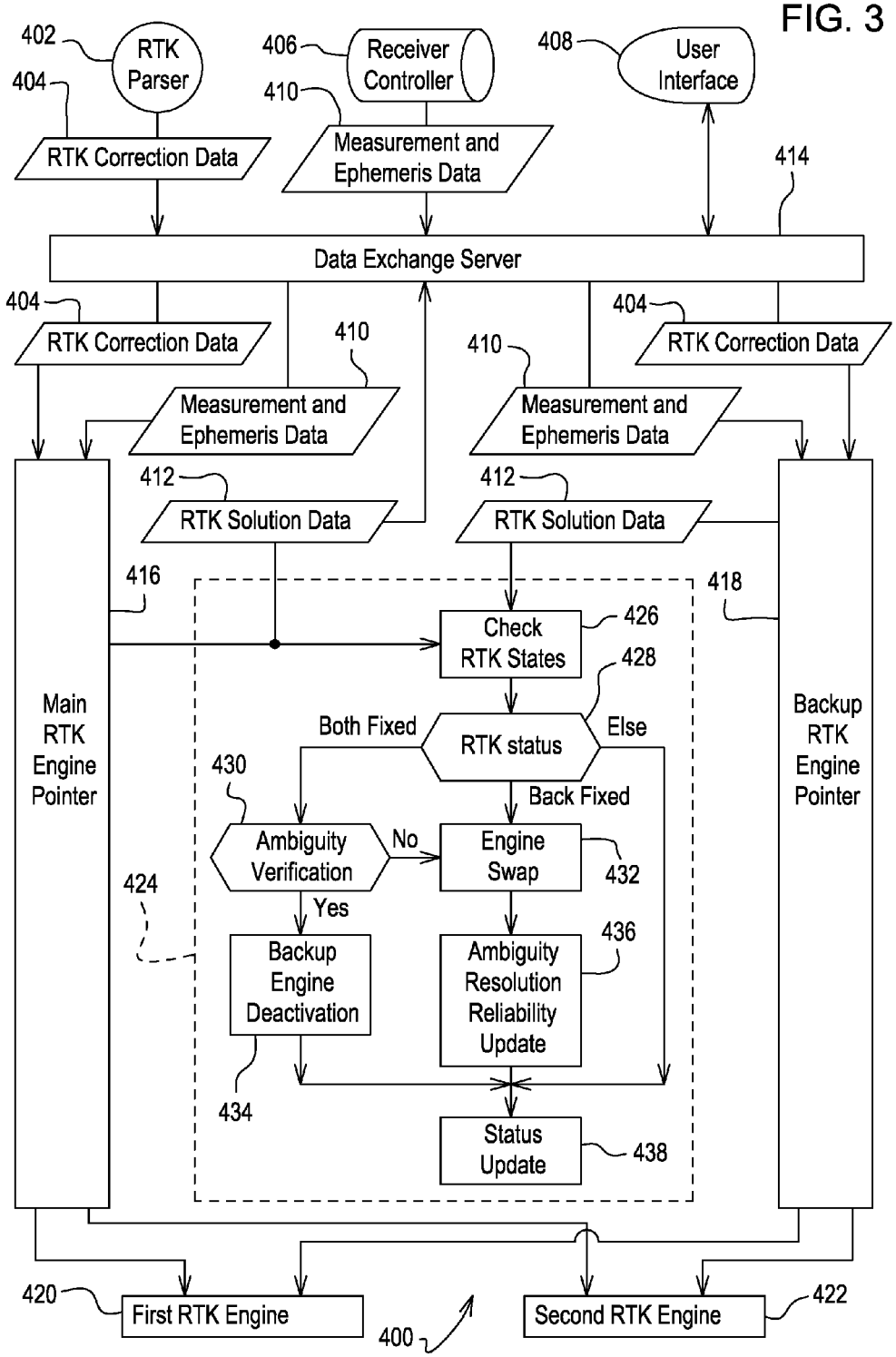
FIG. 3 is a block diagram of a third embodiment of a system for estimating position using dual real time kinematic engines.

FIG. 3 illustrates a third embodiment of a system for determining location with a dual real time kinematic (RTK) engines.

FIG. 3 comprises an RTK parser 402, a receiver controller 406, and a user interface 408 coupled to a data exchange server 414. A main RTK engine pointer 416, a backup RTK engine pointer 418, and a controller 424 are coupled to the data exchange server 414. In turn, the main RTK engine pointer 416 is capable of communicating with the first RTK engine 420 and the second RTK engine 422. Meanwhile, the backup RTK engine pointer 418 is capable of communicating with the first RTK engine 420 and the second RTK engine 422. The first RTK engine 420 is generally analogous to the primary real time kinematic engine 18 of the other embodiments, whereas the second RTK engine 422 is generally analogous to the secondary real time kinematic engine 20 of the other embodiments. However, the main RTK engine pointer 416 and the backup engine pointer may be integral with or subsumed within the primary real time kinematic engine 18 and the secondary real time kinematic engine 20.

The RTK parser 402 receives input from a correction receiver 24, for example. The RTK parser 402 filters, organizes, or otherwise processes the correction data or RTK correction data 404 to facilitate ambiguity resolution of the carrier phase measurements. The RTK parser 402 provides the RTK correction data 404 to the data exchange server 414 where it is stored or routed to the main RTK engine pointer 416 or the backup RTK engine pointer 418.

The receiver controller 406 provides carrier phase measurement data and ephemeris data 410. The carrier phase measurement data may originate from a phase measurement device 14 that receives a signal or data from the receiver front end 12, for example. The ephemeris data comprises satellite orbital information or collection of data on the positions of satellites with reference to from one or more reference positions on or near the Earth's surface in accordance to a schedule of time. The ephemeris data may be expressed as spherical polar coordinates that are stored in a database or in one or more files. Satellites may transmit the ephemeris data in a navigation message that is capable of reception by the location-determining receiver. The receiver controller 406 provides the phase carrier measurement data and the ephemeris data to the data exchange server 414, where it is stored or routed to the main RTK engine pointer 416 or the backup RTK engine pointer 418.

The user interface 408 is capable of communication with the data exchange server 414. The user interface 408 allows a user to perform maintenance and program updates to the controller 55 or other software associated with the location-determining receiver. In one embodiment, the user interface 408 and the controller 55 may support the provision of a user-definable option to activate the secondary RTK engine for a predetermined time interval (e.g., of at least 1-5 minutes) during periods which depends on distant separation from reference to user receiver.

The data exchange server 414 comprises a data processor or data processing module that includes a data storage device. The data storage device may comprise electronic memory, optical data storage, magnetic data storage or another data storage device. The data exchange server 414 supports storage and retrieval of data and routing of the data within the location-determining receiver 10, for example.

The main RTK engine pointer 416 points to the memory location or data storage registers of one or more ambiguity solutions in the first RTK engine 420, the second RTK engine, or both. For example, the first RTK engine 420 may organize the ambiguity solutions within a stack (e.g., first-in, first out) or stored in another data register configuration. Similarly, the backup RTK engine points to the memory location or data storage registers of one or more ambiguity solutions in the first RTK engine 420, the second RTK engine, or both. For example, the second RTK engine 422 may organize the ambiguity solutions within a stack (e.g., first-in, first out) or stored in another data register configuration.

The first RTK engine 420 receives as input data the RTK correction data 404, carrier phase measurement data, and ephemeris data from the data exchange server 414, via the main RTK engine pointer 416 or otherwise. The first RTK engine 420 outputs ambiguity resolution data based on the foregoing input data, which may include one or more of the following: RTK correction data 404, carrier phase measurement data, and ephemeris data, where the input data is associated with or limited to a time period or epoch in which the first RTK engine 420 is active.

The second RTK engine 422 receives as input data the RTK correction data 404, carrier phase measurement data, and ephemeris data from the data exchange server 414, via the main RTK engine pointer 416 or otherwise. The second RTK engine 422 outputs ambiguity resolution data based on the foregoing input data, which may include one or more of the following: RTK correction data 404, carrier phase measurement data, and ephemeris data, where the input data is associated with or limited to a time period or epoch in which the second RTK engine 422 is active.

The controller 424 has a program instructions, logic instructions or software instructions which are illustrated within the controller 424 block in FIG. 3. The software, logic or program instructions begin in block 426.

In block 426, the controller 424 checks the RTK states based on RTK solution data 412 provided by the main RTK engine pointer 416 or the backup RTK engine pointer 418. The RTK states may include the first RTK engine 420 being in an active or inactive state, the second RTK engine 422 being in an active or inactive state. Further, the RTK states may include a time stamp as to when the first RTK engine 420 became active or how long the first RTK engine 420 has been active with reference to the current time. Similarly, the RTK states may include a time stamp as to when the second RTK engine 422 became active or how long the second RTK engine 422 has been active with reference to the current time.

In block 428, the controller 424 determines whether both the first RTK engine 420 and the second RTK engine 422 are fixed on or locked on RTK solutions of position, attitude, or both within the RTK solution data 412. For example, a loss of lock on the RTK solutions (e.g., of estimated position or attitude) may occur if the location-determining receiver 10, or its antenna, moves to position where a signal path from the satellite is obstructed or attenuated. If both the first RTK engine 420 and the second RTK engine 422 are fixed or locked on RTK solutions, the procedure continues with block 430. If one of the first RTK engine 420 and the second RTK engine 422 are fixed on or locked on RTK solutions, then the method continues with block 432. However, where neither the first RTK engine 420, nor the second RTK engine 422 are not both fixed on or locked on the RTK solution data 412, the procedure continues with block 438.

In block 430, the controller 424 compares the ambiguity solution provided by the first RTK engine 420 and the second RTK engine 422 to cross-check for accuracy. For example, the controller 424 engages in an ambiguity solution verification process to assure that the ambiguity solution is accurate to a desired level of reliability that is estimated based on the comparison, statistical analysis, or otherwise.

In one embodiment, to cross-check for accuracy or manage quality of the ambiguity solution, the quality evaluator 22 is applied to the first RTK engine 420 and the second RTK engine 422 to ensure the reliability of the selected ambiguity set inside of each RTK engine. The quality evaluator may impact the processes or steps in blocks 426, 428 and 430 in FIG. 3 to facilitate optimizing or maximizing the quality and timeliness (e.g., in real time for vehicular navigation) of the ambiguity solutions. After steps in blocks 426, 428 and 430, the controller 424 can generate a series of control commands to turn on or turn off the backup RTK engine, to swap the RTK engines, and/or to update ambiguity resolution reliability threshold accordingly in two RTK engines.

In block 434, if the first RTK engine 420 or the second RTK engine 422 is acting as the lead RTK engine and is operating with the desired level of reliability or if the results of the cross-check are successful, the backup RTK engine is deactivated. The backup RTK engine is (or becomes) the first RTK engine 420 or the second RTK engine 422 that is not currently designated by the controller 424 as the lead RTK engine. Either the first RTK engine 420 or the second RTK engine 422 can be designated as the lead, and the responsibilities for lead and backup can be handed-off or swapped between the two RTK engines to provide enhanced reliability and accuracy of the RTK solution or ambiguity resolution for carrier phase determination of the carrier signals received by the location-determining receiver 10.

In block 432, the lead roles of the first RTK engine 420 and the second RTK engine 422 are swapped (i.e., the main and back up roles are reversed), where the backup RTK provides a more accurate assessment of the RTK solution or ambiguity solution for the carrier phase. The backup RTK engine may provide a more accurate assessment of the RTK solution or ambiguity solution because the backup may be started after or in a different epoch than the lead RTK engine. Further, the reliability level of the ambiguity resolution is generally higher for the backup RTK engine, when the lead roles of the first RTK engine 420 and second RTK engine 422 are swapped. Accordingly, the procedure in block 432 may support back fixing of the RTK solution.

In block 436, the controller 424 or quality evaluator 22 updates the ambiguity resolution reliability level based on the engine swapping that occurred previously in block 432.

In block 438, the controller 424 provides a status update of the first RTK engine 420 and the second RTK engine 422 to confirm which is active, which has the lead and which is the backup. The controller 424 may reinitialize or reset the backup engine to clear its states and make it ready or available for starting at a different time window or epoch than the active or lead RTK engine. Under extreme circumstances, where the states of the error reducing filter, the first RTK engine 420 and the second RTK engine 422 are corrupt or inaccurate, the controller 424 may reinitialize or reset both the first RTK engine 420 and the second RTK engine 422, where the reinitialization is done at once for both RTK engines or in a time staggered or time offset manner to provide enhance reliability afforded by different start-up times of the RTK engines.

Figure 4:
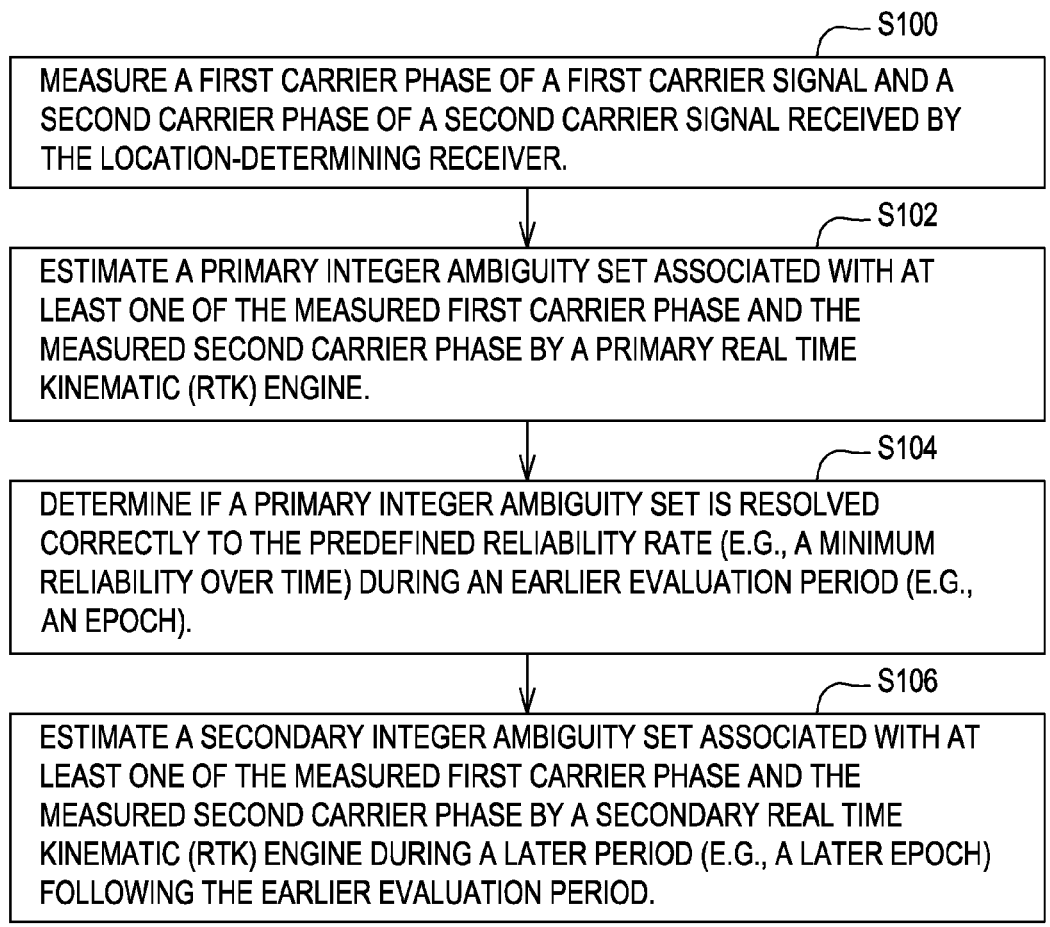
FIG. 4 is a flow chart of a first embodiment of a method for estimating position using dual real time kinematic engines.

FIG. 4 is a flow chart of a method for estimating the position of an object or vehicle associated with a location-determining receiver 10. The method of FIG. 4 begins in step S100, In step S100, a phase measurement device 14 or receiver data processing system 16 measures a first carrier phase of a first carrier signal and a second carrier phase of a second carrier signal received by the location-determining receiver.

In step S102, the primary real time kinematic engine 18 or receiver data processing system 16 estimates a primary integer ambiguity set associated with at least one of the measured first carrier phase and the measured second carrier phase by a primary real time kinematic engine 18.

In step S104, the quality evaluator 22 or receiver data processing system 16 determines if a primary integer ambiguity set is resolved correctly to the predefined reliability rate (e.g., minimum reliability over time) during an earlier evaluation period (e.g., an epoch).

In step S106, the secondary real time kinematic engine 20 or receiver data processing system 16 estimates a secondary integer ambiguity set associated with at least one of the measured first carrier phase and the measured second carrier phase by a secondary real time kinematic RTK engine during a later period (e.g., a later epoch) following the earlier evaluation period.

Figure 5:
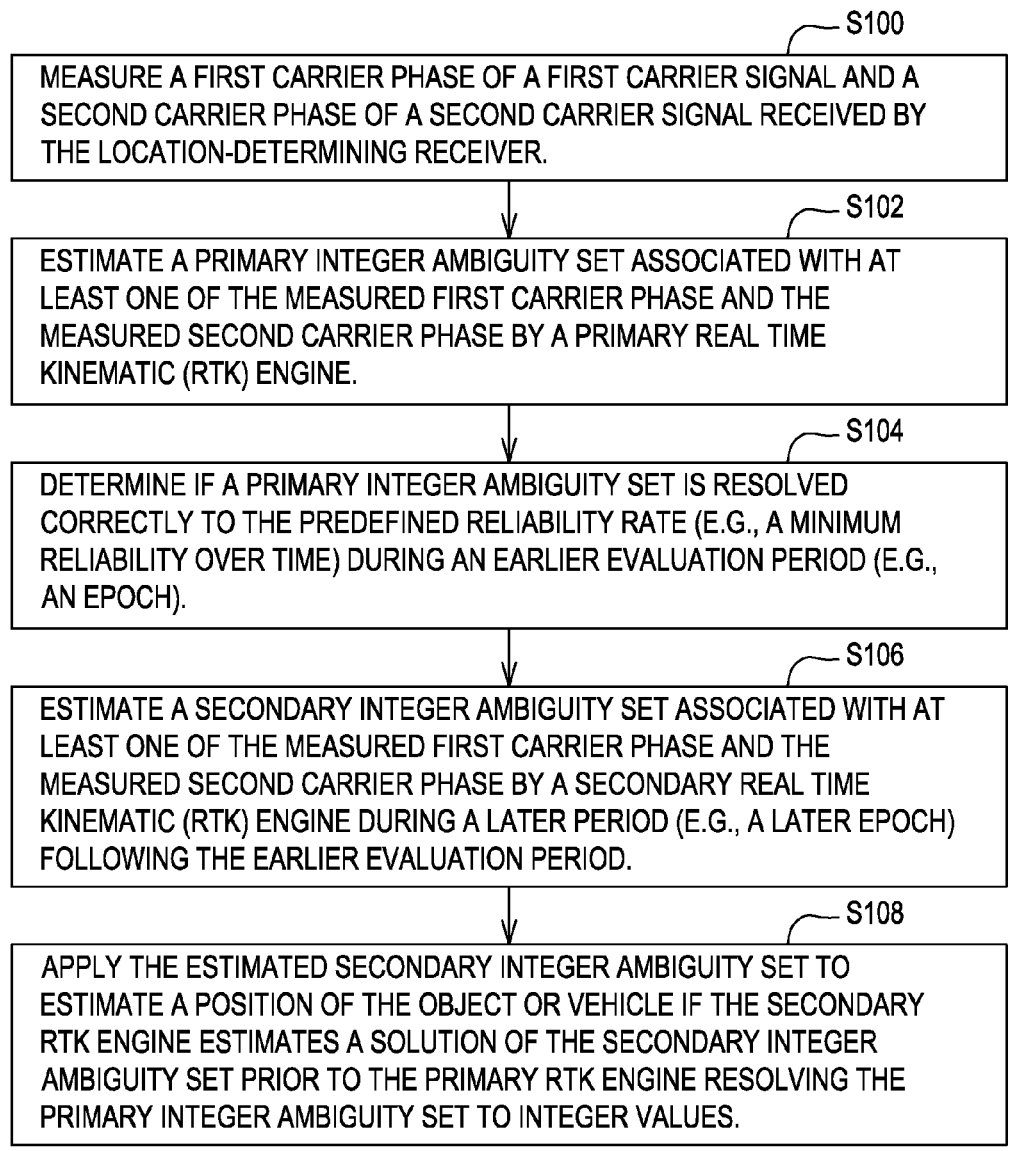
FIG. 5 is a flow chart of a second embodiment of a method for estimating position using dual real time kinematic engines.

The method of FIG. 5 is similar to the method of FIG. 4, except the method of FIG. 5 further comprises step S108. Like reference numbers in FIG. 5 and FIG. 4 indicate like steps or procedures.

In step S108, the controller 55 or receiver data processing system 16 applies the estimated secondary integer ambiguity set to estimate a position of the object or vehicle if the secondary RTK engine estimates a solution of the secondary integer ambiguity set prior to the primary RTK engine resolving the primary integer ambiguity set to integer values.

Step S108 may be executed in accordance with various techniques that may be applied alternately or cumulatively. Under a first technique, the controller 55 or data processing system uses the least-squares method or Kalman filter techniques to estimate the solution of the secondary integer ambiguity set. Under a second technique, the primary RTK engine is reinitialized after a current epoch and swapped with the secondary RTK engine (e.g., for the next epoch or longer) such that the original secondary RTK engine serves as primary RTK engine to estimate a position of the object using the estimated integer set.

Figure 6:
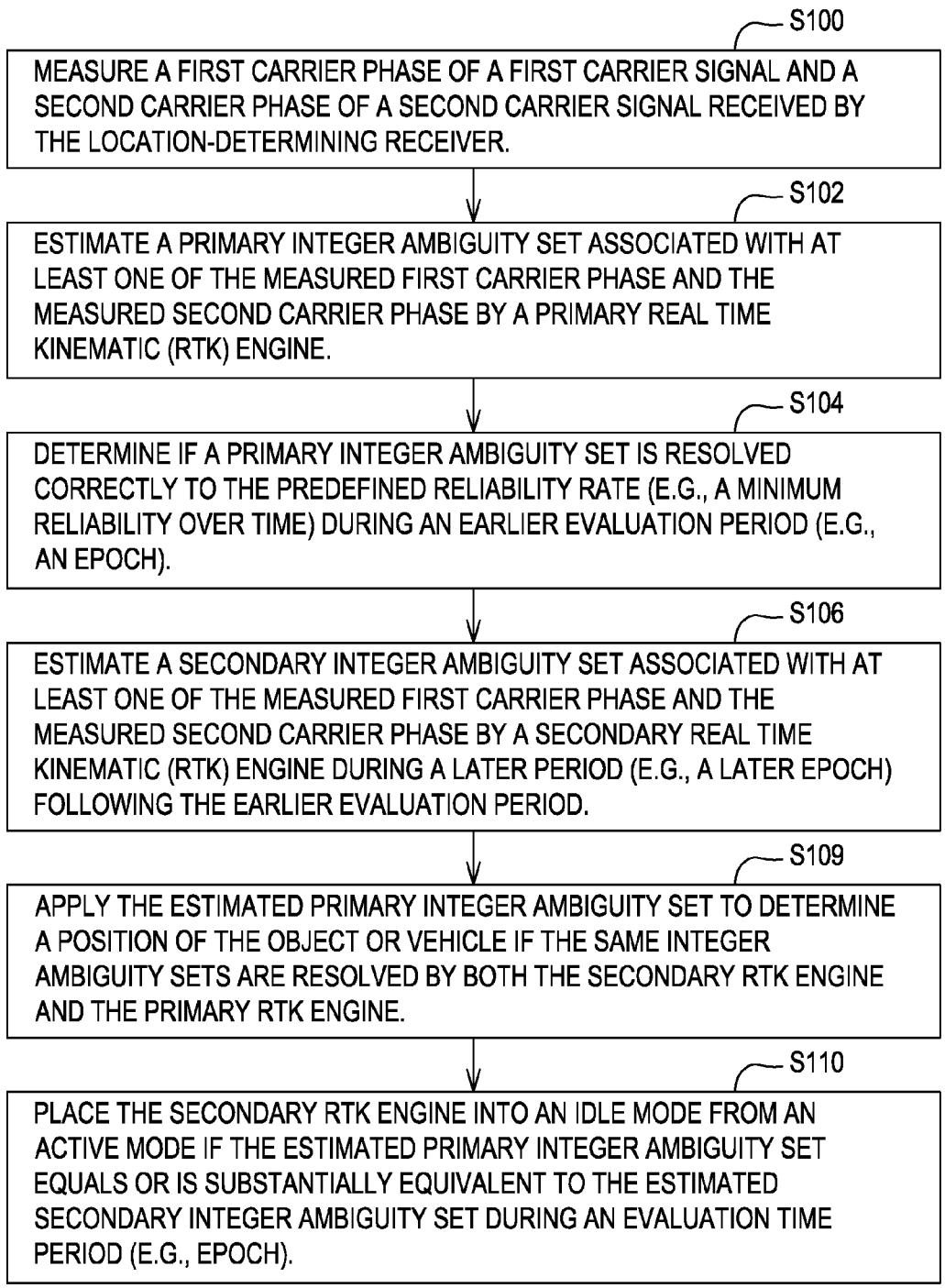
FIG. 6 is a flow chart of a third embodiment of a method for estimating position using dual real time kinematic engines.

The method of FIG. 6 is similar to the method of FIG. 4, except the method of FIG. 5 further comprises steps S109 and S110. Like reference numbers in FIG. 6 and FIG. 4 indicate like steps or procedures.

In step S109, the controller 55 or receiver data processing system 16 applies the estimated primary integer ambiguity set to determine a position of the object or vehicle if the same integer ambiguity sets are resolved from both the secondary RTK engine and the primary RTK engine. Step S109 may be executed in accordance with various techniques, that may be applied alternately or cumulatively. Under a first technique, the controller 55 or receiver data processing system 16 applies the estimated primary integer ambiguity to determine a position of the object if the secondary RTK engine and the primary RTK engine are both active. Under a second technique, the controller 55 or receiver data processing system 16 applies the estimated primary integer ambiguity to determine a position of the object if the secondary RTK engine and the primary RTK engine are both active, until the estimated primary integer ambiguity equals or is substantially equivalent to the estimated secondary integer ambiguity during an evaluation time period (e.g., epoch).

In step S110, the controller 55 or receiver data processing system 16 places the secondary RTK engine into an idle mode from an active mode if the estimated primary integer ambiguity equals or is substantially equivalent to the estimated secondary integer ambiguity during an evaluation time period (e.g., epoch).

Figure 7:
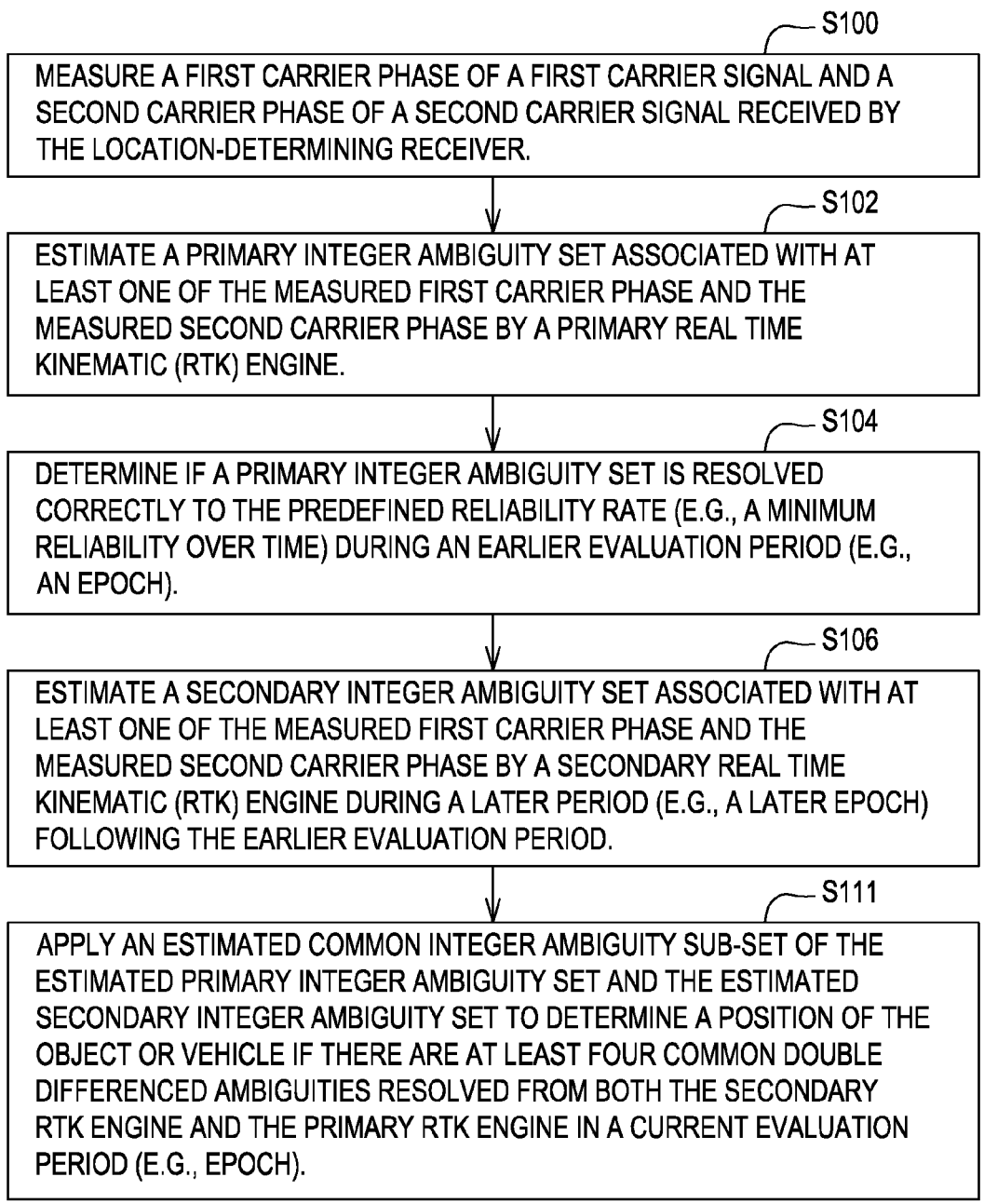
FIG. 7 is a flow chart of a fourth embodiment of a method for estimating position using dual real time kinematic engines.

The method of FIG. 7 is similar to the method of FIG. 4 except that the method of FIG. 7 further comprises step S111. Like reference numbers in FIG. 7 and FIG. 4 indicate like steps or procedures.

In step S111, the controller 55 or receiver data processing system 16 applies an estimated common integer ambiguity sub-set of the estimated primary integer ambiguity set and the secondary integer ambiguity set to determine a position of the object or vehicle if there are at least four common double differenced ambiguities resolved from both the secondary RTK engine and the primary RTK engine at current epoch. The double difference refers to a mathematical technique or procedure that eliminates the receiver clock bias (e.g., by the first difference between carrier phase measurements) and the satellite clock bias (e.g., by the second difference between carrier phase measurements). The atmospheric effects on the GPS measurements can also be largely reduced when the inter-receiver distance is not very long. The double difference can be determined by subtracting two single difference GPS carrier phase measurements measured at a location determining receiver 10 and at a reference station (e.g., 40 or 41 in FIG. 1) with respect to satellite signals from two different satellites, for example.

In an alternate configuration of carrying out step S111, the controller 55 or receiver data processing system 16 may reset the secondary RTK engine and reinitialize the secondary RTK engine, or the states of the error-reducing filter 25 associated with either of the engines, if primary integer ambiguity and the secondary integer ambiguity are identical for less than four double difference integer ambiguity states. Further, the controller 55 or receiver data processing system 16 may use output from the primary RTK engine to estimate a solution for integer ambiguity after the secondary RTK engine reinitialization.

Figure 8:
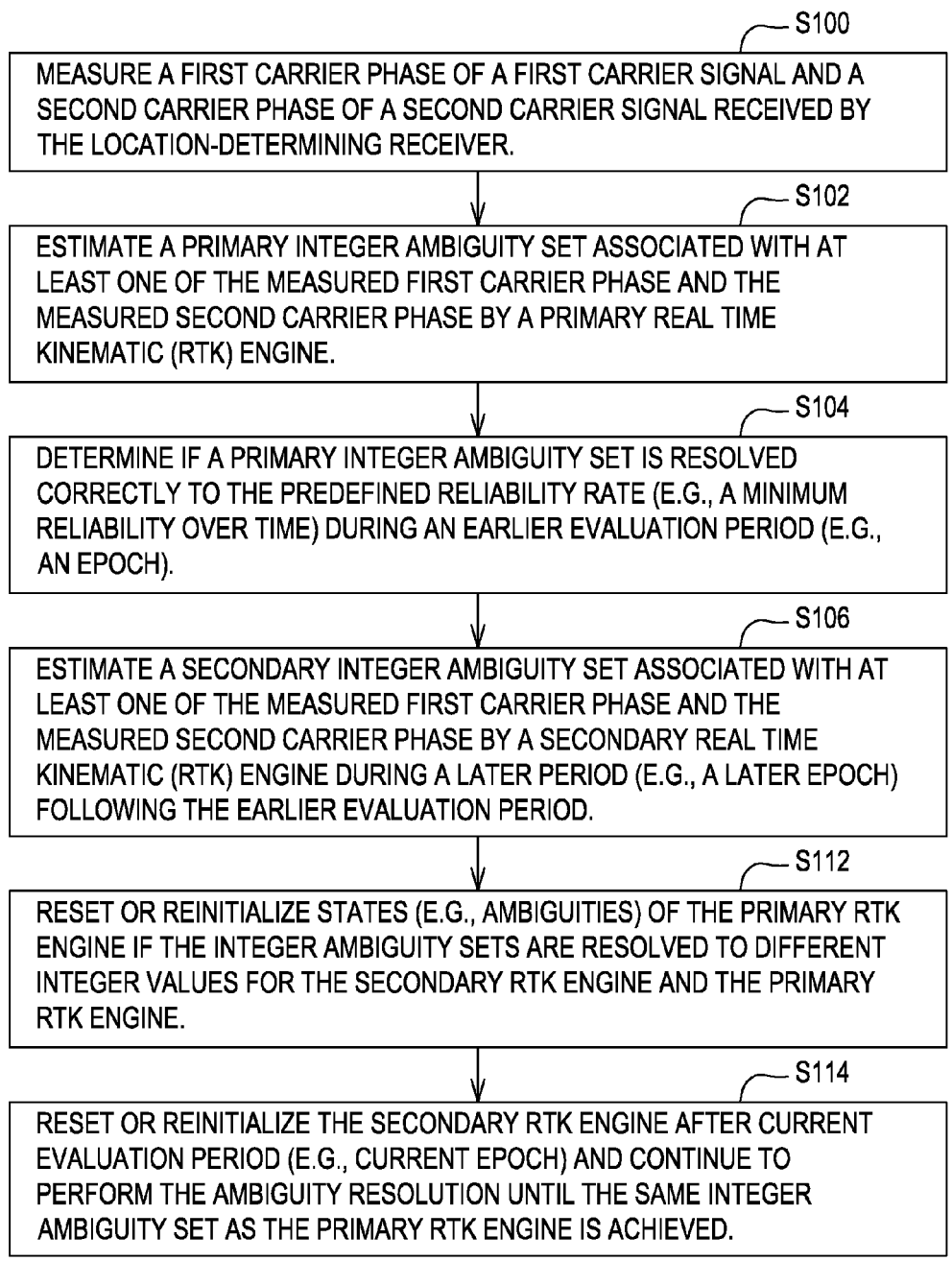
FIG. 8 is a flow chart of a fifth embodiment of a method for estimating position using dual real time kinematic engines.

The method of FIG. 8 is similar to the method of FIG. 4 except the method of FIG. 8 further comprises step S112 and step S114. Like reference numbers in FIG. 8 and FIG. 4 indicate like steps or procedures.

In step S112, the controller 55 or receiver data processing system 16 resets ambiguities from primary RTK engine if they are resolved to different integer values from both the secondary RTK engine and the primary RTK engine.

In step S114, the controller 55 or receiver data processing system 16 reinitializes the secondary RTK engine after current epoch and continues to perform the ambiguity resolution until the same integer ambiguity set as the primary RTK engine is achieved.

Figure 9:
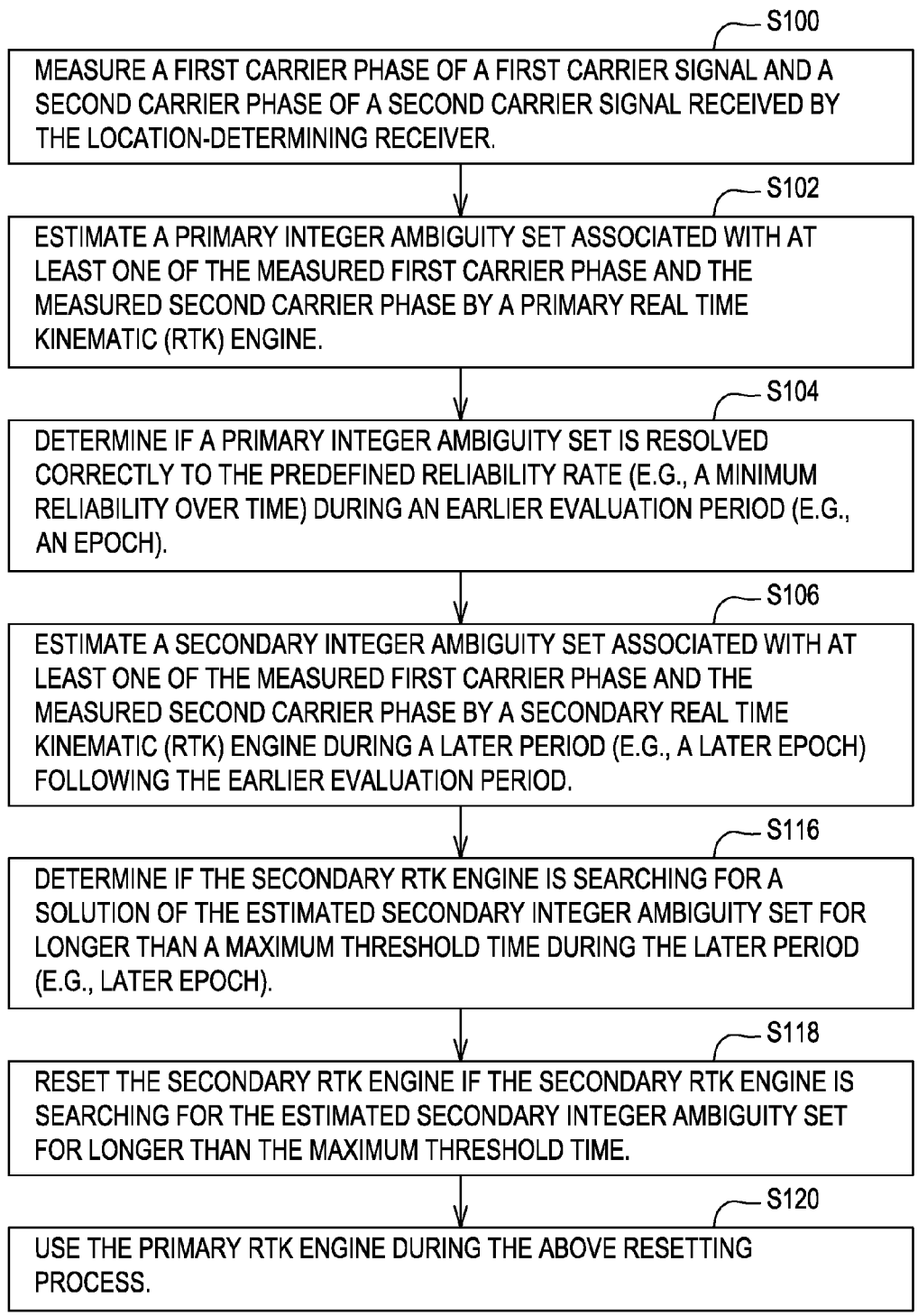
FIG. 9 is a flow chart of a sixth embodiment of a method for estimating position using dual real time kinematic engines.

The method of FIG. 9 is similar to the method of FIG. 4 except the method of FIG. 9 further comprises step S116, step S118, and step S120. Like reference numbers in FIG. 9 and FIG. 4 indicate like steps or procedures.

In step S116, the controller 55 or receiver data processing system 16 determines if the secondary RTK engine is searching for a solution of the estimated secondary integer ambiguity for longer than a maximum threshold time during the later period (e.g., later epoch).

In step S118, the controller 55 or receiver data processing system 16 resets the secondary RTK engine if the secondary RTK engine is searching for the estimated secondary integer ambiguity for longer than the maximum threshold time.

In step 120, the controller 55 or receiver data processing system 16 uses the primary RTK engine during the resetting process.

The dual RTK engine concept is well suited for improving the RTK availability and reliability in challenging signal reception environment, where the location determining receiver of reasonable sensitivity receives one or more satellite signals of poor signal quality (e.g., low signal level). The present system and method disclosed in this document mitigates the impact of imprecise pseudorange and carrier phase measurements in error-reducing filter or RTK Kalman filter. For instance, the present system and method may avoid the delay associated with reinitializing a single RTK engine or Kalman filter states after encountering corrupt ambiguity resolution or cycle slips associated with low signal quality or communication outages or transient disruptions between the location determining receiver and one or more satellites. Although increasing the sensitivity of the location determining receiver can improve signal reception in a challenging signal reception environment, such approaches are limited by additional expense of the location determining receiver and practical limits associated with background electromagnetic noise or the noise floor. The present system and method is well suited for reducing the susceptibility of the RAIM algorithm in the RTK engine to imprecise carrier phase measurements and to quickly repair or mitigate the effects of incorrect ambiguity fixes that have been observed during transient periods of poor reception of the location determining receiver.

In dual RTK engine approach, a backup RTK engine is running simultaneously with the main RTK engine. When the main engine drops out of RTK fixed mode, the backup engine is initialized to resolve ambiguity as well. The main advantage of this approach is the backup RTK engine gets started at a different epoch so its Kalman filter may not be corrupted by the imprecise measurements as the main RTK engine is. In such cases, the backup engine is able to fix ambiguity faster than the main engine. In order to improve the fixing reliability, the ambiguity fixing threshold is set to higher than the main engine. Once the backup engine fixes ambiguity first, it will be replace the main engine to output navigation solutions since its ambiguity reliability is higher than the main engine. If the main engine resolves ambiguity first, the backup engine will keep fixing ambiguities. Once the back engine fixes ambiguities, the integer values in the backup engine will be used to validate the fixed ambiguities in the main RTK engine. If the integer ambiguity values are identical, the backup engine will be set to idle mode for further activation. In the case the integer ambiguities are partially identical (two engines share at least four double difference integer ambiguities), the ambiguity states with the discrepant integer values will be reset in the main engine while the backup engine will be completely reinitialized. When the identical ambiguities are less than four, both the main and backup RTK engines will be reset completely. If the backup RTK engine keeps in float and the searching time is beyond the ambiguity searching time limit, which is defined as a function of baseline length, it will be fully reset to mitigate the impact of imprecise measurements on the Kalman filter in backup RTK engine.

Once the carrier phase ambiguities in the main engine are verified, the backup RTK engine is set to idle mode. It will be reactivated over a pre-determined time interval (e.g., approximately ten to thirty minutes or in accordance with other factory settings) to double check the fixed ambiguities in the main RTK engine. This is very helpful to detect the incorrect ambiguity fixes over long baseline (more than 30 kilometers (km)) in active solar conditions. In such cases, the double difference slant ionospheric delays can be as large as one carrier phase cycle. The incorrect ambiguities can only become observable when the change of satellite geometry is able to isolate the slant ionospheric delay from the carrier phase ambiguity state for low elevation satellites.

Having described the preferred embodiment, it will become apparent that various modifications can be made without departing from the scope of the invention as defined in the accompanying claims.

The following is claimed:

1. A method for estimating one or more integer ambiguity sets related to estimating the position of an object by a location-determining receiver associated with the object, the method comprising:
   measuring a first carrier phase of a first carrier signal and a second carrier phase of a second carrier signal received by the location-determining receiver;
   estimating a primary integer ambiguity set associated with at least one of the measured first carrier phase and the measured second carrier phase by a primary real time kinematic (RTK) engine;
   determining if the primary integer ambiguity set is resolved correctly to a predefined reliability rate during an earlier evaluation period based one or more reliability tests applied to a quadratic form of carrier phase residuals;
   estimating a secondary integer ambiguity set associated with at least one of the measured first carrier phase and the measured second carrier phase by a secondary real time kinematic (RTK) engine during a later period following the earlier evaluation period;
   establishing a time offset between respective start-up times of the primary RTK engine and the secondary RTK engine to support enhanced reliability by avoiding or reducing corruption from imprecise measurements;
   determining if the secondary RTK engine is searching for a solution of the estimated secondary integer ambiguity for longer than a maximum threshold time during the later evaluation period;
   resetting the secondary RTK engine if the secondary RTK engine is searching for the estimated secondary integer ambiguity for longer than a maximum threshold time; and
   using the primary RTK engine during the resetting process.

2. The method according to claim 1 further comprising:
   applying the estimated secondary integer ambiguity set to estimate a position of the object if the secondary RTK engine estimates a solution using the Least-Square method or Kalman filter techniques of the secondary integer ambiguity set prior to the primary RTK engine resolving the primary integer ambiguity set to integer values.

3. The method according to claim 1 further comprising:
   applying the estimated primary integer ambiguity set to determine a position of the object if the same integer ambiguity sets are resolved from both the secondary RTK engine and the primary RTK engine.

4. The method according to claim 1 further comprising:
   placing the secondary RTK engine into an idle mode from an active mode if the estimated primary integer ambiguity equals or is substantially equivalent to the estimated secondary integer ambiguity during an evaluation time period.

5. The method according to claim 1 further comprising:
   applying an estimated common integer ambiguity sub-set of the primary and secondary integer ambiguity sets to determine a position of the object if there are at least four common double differenced ambiguities resolved from both the secondary RTK engine and the primary RTK engine at a current epoch; and
   determining the primary integer ambiguity and secondary integer ambiguity sets during simultaneous operation of the primary RTK engine and the secondary RTK engine, respectively, for estimation of the common integer ambiguity subset that is the same or substantially equivalent between the primary integer ambiguity and the second integer ambiguity sets.

6. The method according to claim 1 further comprising:
   resetting ambiguities from the primary RTK engine if they are resolved to different integer values than collectively from both the secondary RTK engine and the primary RTK engine, and
   reinitializing the secondary RTK after a current epoch and continuing to perform the ambiguity resolution until the same integer ambiguity set as the primary RTK engine is achieved.

7. The method according to claim 1 further comprising:
   providing a user-definable option to activate the secondary RTK engine for a predetermined time interval during periods which depends on distant separation from reference station to user receiver.

8. The method according to claim 1 further comprising:
   applying the estimated primary integer ambiguity to determine a position of the object if the secondary RTK engine and the primary RTK engine are both active.

9. The method according to claim 1 further comprising:
   applying the estimated primary integer ambiguity to determine a position of the object if the secondary RTK engine and the primary RTK engine are both active, until the estimated primary integer ambiguity equals or is substantially equivalent to the estimated secondary integer ambiguity during an evaluation time period.

10. A system for estimating the position of an object by a location-determining receiver associated with the object, the system comprising:
   a phase measurement device for measuring a first carrier phase of a first carrier signal and a second carrier phase of a second carrier signal received by the location-determining receiver, the phase measurement device comprising a signal generator for generating a reference signal having a reference phase, a first correlator for receiving the reference signal and the received first carrier signal to generate a first output signal indicative of the measured first carrier phase and a second correlator for receiving the reference signal and the received second carrier signal to generate a second output signal indicative of the measured second carrier phase, the phase measurement device comprising a signal generator for generating a reference signal having a reference phase, a first correlator for receiving the reference signal and the received first carrier signal to generate a first output signal indicative of the measured first carrier phase and a second correlator for receiving the reference signal and the received second carrier signal to generate a second output signal indicative of the measured second carrier phase;
   a primary real time kinematic (RTK) engine for receiving the measured first carrier phase and the measured second carrier phase and estimating a primary integer ambiguity associated with at least one of the measured first carrier phase and the measured second carrier phase by a primary RTK engine;
   a signal quality evaluator for determining if the first carrier signal or the second carrier signal has a signal quality below a threshold signal quality level during an earlier evaluation period or epoch; and
   a secondary real time kinematic (RTK) engine for estimating a secondary integer ambiguity associated with at least one of the measured first carrier phase and the measured second carrier phase during a later period following the earlier evaluation period.

11. The system according to claim 10 further comprising:
an error-reducing filter having a filter input receiving data from outputs of the primary RTK engine and the secondary RTK engine.

12. The system according to claim 11 further comprising:
a position estimator for receiving filter output data from a filter output of the error-reducing filter, the measured first carrier phase, and the measured second carrier phase.

13. The system according to claim 12 further comprising:
a decoder for comparing a reference pseudorandom code with a received pseudorandom code to estimate a course position estimate for the object, the course position estimate provided as input data to the position estimator.

14. The method according to claim 2 wherein the primary RTK engine is reinitialized after current epoch and swapped with the secondary RTK engine.

15. A method for estimating the position of an object by a location-determining receiver associated with the object, the method comprising:

measuring a first carrier phase of a first carrier signal and a second carrier phase of a second carrier signal received by the location-determining receiver;

estimating a primary integer ambiguity set associated with at least one of the measured first carrier phase and the measured second carrier phase by a primary real time kinematic (RTK) engine;

determining if the primary integer ambiguity set is resolved correctly to the predefined reliability rate during an earlier evaluation period; and estimating a secondary integer ambiguity set associated with at least one of the measured first carrier phase and the measured second carrier phase by a secondary real time kinematic (RTK) engine during a later period following the earlier evaluation period;

resetting the secondary RTK engine and reinitialize the secondary RTK engine if primary integer ambiguity and the secondary integer ambiguity are identical for less than four double difference integer ambiguity states; and using output from the primary RTK engine to estimate a solution for integer ambiguity after the secondary RTK engine reinitialization.

\* \* \* \* \*